United States Patent Office 3,042,632
Patented July 3, 1962

3,042,632
CATALYST COMPOSITION AND PROCESS OF PREPARING POLYURETHANE FOAM CONTAINING SAME
William E. Erner, Wilmington, Del., assignor to Air Products and Chemicals, Inc., a corporation of Delaware
No Drawing. Filed June 5, 1958, Ser. No. 739,993
3 Claims. (Cl. 260—2.5)

This invention relates to the preparation of polyurethane foam, and particularly to the use of novel combination of catalysts. The invention also relates to the catalyst compositions.

Polyurethane foams have been prepared by the reaction between organodiisocyanates and polyhydroxy compositions in the presence of a minor amount of an aqueous solution of a basic catalyst. During the reaction, tiny bubbles of carbon dioxide are generated by the reaction between water and isocyanate groups. The reaction mixture, which is initially sufficiently flowable to be poured into a mold, undergoes a polymerization, transforming it into a solid article suitable for handling in the heat treating and/or other stabilizing treatments. Because the polymerization reactions and carbon dioxide generation reactions proceed concurrently, the preparation of polyurethane foam material differs from the preparation of many other foam materials.

Efforts have been made to prepare polyurethane foams using appropriate polyethers instead of the more expensive polyesters. In order to use such polyethers, it has generally been necessary to prepare a prepolymer by the reaction of the polyether with organodiisocyanate. It has been necessary to regulate the first stage polymerization so that the prepolymer would have a sufficiently low viscosity to be suitable for mixing with an aqueous solution of catalyst. The necessity for pouring this mixture into appropriate molds has helped to make prepolymer preparation a difficult art. Numerous difficulties have been encountered in practicing the prepolymer method of polyurethane foam production. Some prepolymers have solidified after storage for only a few weeks. Only moderate heat has been generated during foaming of a prepolymer, thus necessitating a stabilization or curing treatment at an elevated temperature. Accordingly, a continued effort has been made for many years to devise a suitable method of preparing polyurethane foams from polyglycols without resorting to the prepolymer technique.

Inferior quality foam materials, although initially resilient, deteriorate to higher density stiffer materials when compressed for a prolonged time. An accelerated aging test for foam materials comprises compressing the foam, heating it, releasing it, and measuring the extent of recovery of its initial thickness. In modifications of such compression set tests, the extent of compression during the test, the temperature, the duration of treament, and other factors have been varied in an effort to obtain better correlation with prolonged use of the foams. Cushions for use in chairs, automobiles, etc. should desirably have at least 80 of their initial height after heating for 6 hours at 70° C. while compressed 90%, that is to 10% of its initial thickness. The results are sometimes expressed as "compression set" using the formula $$\frac{A-B}{A-C} \times 100 = \text{percent compression set}$$

in which A is the initial thickness, B is the thickness after compression, heating and recovery, and C is the thickness during compression. If a polyurethane foam contains a relatively large number of unreacted groups the heat and compression of the test will cause such groups to react, and the material will have a relatively high compression set. If the catalyst employed in preparing the polyurethane foam promotes a high degree of completeness of reaction, the foam will have a relatively low compression set. Accordingly, one of the several methods for measuring the effectiveness of a catalyst involves the determination of the minimum compression set at maximum catalyst concentrations and/or the minimum catalyst concentration effective in achieving a predetermined compression set. The evidence of catalyst effectiveness obtained in connection with resilient foams is also applicable to rigid and semi-rigid foams. Because many compositions comprising a tertiary amine have so nearly the same effectiveness as catalysts for polyurethane foam preparation, some investigations of polyurethane foams have essentially assumed the equivalence of catalysts and studied only the influence of other variables. However, as explained in U.S. Patent 2,939,851 of M. Orchin, Serial No. 661,014, filed May 23, 1957, triethylene diamine has an effectiveness as a polyurethane foam catalyst which is far superior to that of previously employed tertiary amines. This invention concerns an improvement over the method of preparing polyurethane foams disclosed in said application.

Base strengths are sometimes expressed by the ionization constants. Such ionization constants have been measured by studying the reversible reaction by which the base is dissociated to provide hydroxyl ions, and applying the formula $$K = \frac{[Q^+][OH^-]}{[QOH]}$$

A weak base such as aniline has an ionization constant of 0.00000000046, sometimes expressed as $4.6 \times 10^{-10}$ or as $pK_b$ of 9.33. Ethylene diamine has an ionization constant of 0.000085, sometimes expressed as $8.5 \times 10^{-5}$ or as $pK_b$ of 4.07. One of the most used polyurethane catalysts, triethylamine, has an ionization constant of about 0.00064 which is significantly larger than the ionization constant of the highly advantageous triethylene diamine at 0.000008 or $8 \times 10^{-6}$ or $pK_b$ of 5.1. It has not been feasible to predict the usefulness of a base as a polyurethane catalyst on the basis of its ionization constant.

In accordance with the present invention an article of polyurethane foam is prepared from a polyhydroxy composition and diisocyanates by steps comprising: preparing an aqueous solution consisting predominantly of water and containing triethylene diamine in a concentration from 0.5 to 2 molar and a modifying amount of a strong base having an ionization constant greater than 0.01, the molar concentration of the strong base being from about 20% to about 60% of the molar concentration of the triethylene diamine; agitating a mixture consisting essentially of a minor amount of said aqueous solution of triethylene diamine containing said modifying amount of said strong base and a major amount of a polyhydroxy composition, there being from about 20 to about 80 parts of polyhydroxy composition per part of water; adding from about 15 to about 49 parts of organodiisocyanate per 100 parts of polyhydroxy composition; promptly dispersing the diisocyanate throughout the mixture comprising the polyhydroxy composition; causing the diisocyanate to react with the water and polyhydroxy composition in the presence of the strong base and triethylene diamine as cocatalysts to form a low density polyurethane foam article conforming at least partially to the mold in which the foaming reaction occurs; and heat curing the thus prepared article to stabilize its characteristics. In preferred embodiments of the invention, the strong base is a tetraalkylammonium hydroxide which decomposes during the heat curing step to provide a product quite resistant to post-curing polymerization.

The technical subject matter is further clarified by reference to a plurality of examples and to a plurality of descriptions of compositions marketed under brand names.

Propylene oxide is polymerized to a molecular weight of about 1800 and then reacted with ethylene oxide at polymerizing conditions to form a copolymerized polyether containing about 90% polypropylene oxide and about 10% polyethylene oxide having a molecular weight of about 2000, and has an equivalent weight of about 1000 per free hydroxyl group. Such a material is marketed by the Wyandotte Chemical Company under the trademark "Pluronic L-61."

Ethylene diamine is caused to react with propylene oxide to form a derivative in which there are four polypropylene ether glycol chains extending from the ethylene diamine nucleus. Ethylene oxide is employed to bring about a further increase in chain length in this product. The ratio of propylene oxide to ethylene oxide employed is about 9 to 1. The polypropylene-ethylene ether glycol derivative of ethylene diamine has a molecular weight of about 3060 and an equivalent weight of about 865 grams per 17 grams of hydroxyl group. Such a material is marketed by the Wyandotte Chemical Company under the trademark "Tetronic 701."

It is sometimes dsirable to improve the foaming reaction by the inclusion of a polyurethane grade of silicone oil in the reaction mixture. Such a silicone oil is a polydimethyl-siloxane having a viscosity of about 200 centipoises. An appropriate polyhydroxy composition may contain a major amount of a relatively high molecular weight material and a minor amount of a relatively low molecular weight cross-linking agent. Compounds containing three or more hydroxy groups are more effective as cross-linking agents when the molecular weight is relatively low. Accordingly, materials such as glycerol, triethanolamine, the tetraethanol derivative of ethylene diamine trimethylol propane and related compounds have advantages as cross-linking agents in polyurethane foams. A derivative of ethylene diamine having three hydroxy isopropyl groups and one hydroxy ethyl group, conveniently designated as monohydroxyethyltrihydroxyisopropylethylenediamine is marketed as "Visco" by Visco Corporation, of Sugarland, Texas, and is sometimes used as a cross-linking agent for polyurethane foams. A technical grade of tetrahydroxyisopropylethylenediamine is marketed by Wyandotte Chemical Company under the trademark "Quadrol." A technical grade of hydroxyisopropylether of glycerol is marketed by the Dow Chemical Company under the trademark "Hyprin."

*Example I*

A polyhydroxy composition was prepared by mixing 50 grams of Pluronic L-61, 50 grams of Tetronic 701, 0.7 milliliter of silicone oil and 5 grams of Visco.

A catalyst mixture was prepared by dissolving 0.3 gram of triethylene diamine and 0.04 gram of sodium hydroxide in 2.3 milliliters of water to provide 2.5 milliliters of catalyst (1.1 M $N(C_2H_4)_3$ and 0.4 M NaOH) which was mixed with the 105 grams of polyhydroxy composition. Such concentrations of the catalyst solution can also be expressed as 120 grams (1.07 mols) of triethylene diamine and 16 grams (0.4 mol) of sodium hydroxide per liter of solution.

Vigorous mixing of the aqueous catalyst solution and polyhydroxy composition converted the mixture to one having a creamy texture. A technical mixture of about 80% 2,4-tolylenediisocyanate and 20% 2,6-tolylenediisocyanate is marketed by the Allied Chemical Company under the trademark "Nacconate 80." To the creamy mixture of 105 grams of polyhydroxy composition and 2.5 milliliters of aqueous catalyst solution, 33 milliliters of Nacconate 80 were added and stirred vigorously for less than one minute prior to the pouring of the reaction mixture into appropriate molds.

As soon as the ingredients of the reaction mixture are brought together, the isocyanate groups react with the hydroxy groups of the polyhydroxy composition to form polyurethane structural material, and the dispersed water reacts with isocyanate groups to generate carbon dioxide and to form ureide linkages. The polymerization involves both linear chain growth and cross-linking. The rates at which the molecular weight and physical strength of the polyurethane structural material develop and the rates at which the carbon dioxide bubbles form and grow are controlled to a considerable extent by the balanced action of the cooperative catalyst, triethylenediamine and sodium hydroxide. The triethylene diamine functions as a heterogeneous catalyst, and the cage structure of the molecule enhances the catalytic effectiveness. To the extent that the reaction is controlled by the basicity of the aqueous catalytic solution, the strong base, in this case sodium hydroxide, imparts an effect which has not previously been recognized in connection with the efforts to prepare polyurethane foams from polyethers by "one shot" addition of the diisocyanate compound.

The article resulting from the foaming reaction of polyurethane was subjected to a standard preliminary curing and then to a final curing in an oven maintained at about 70° C. to 90° C. for about 2 hours to complete the reaction.

The thus prepared polyurethane foam article had a density of about 2.8 pounds per cubic foot, and had a very satisfactory compression set, and other characteristics of a satisfactory polyurethane foam article.

*Example II*

The strong base component of the catalyst solution was the single variable modified in a series of preparations.

A polyurethane foam article was prepared by a procedure generally like that of Example I except that the concentration of the sodium hydroxide was reduced from 0.4 molar to 0.2 molar. That is, for each 2.3 milliliters of water, only 0.02 gram of sodium hydroxide was employed instead of double said amount as used in Example I. The foam had satisfactory characteristics and a satisfactory compression set.

A polyurethane foam article was prepared by following a procedure as set forth in Example I except the aqueous solution of the catalyst contained only 0.002 gram of sodium hydroxide per 2.3 milliliters of water, that is, a molar concentration of 0.02 instead of 0.2. The foam collapsed during polymerization, producing an intermediate product of such high density that it was not worthwhile to subject it to the curing treatment. The method using 0.02 molar sodium hydroxide exemplifies an inoperative procedure and should be contrasted with the methods embodying the invention.

A polyurethane foam was prepared using the proportions, reactants and procedure of Example I, but substituting 0.056 gram of potassium hydroxide instead of 0.04 gram of sodium hydroxide. The resulting article was quite satisfactory and fully equivalent for most purposes to the article prepared by the use of sodium hydroxide as a cocatalyst.

A polyurethane foam article was prepared by following a procedure as set forth in Example I except that aqueous solution of the catalyst contained no triethylene diamine whatsoever, but contained 0.12 gram of sodium hydroxide per 2.3 milliliters of water. The initial product crumbled readily instead of possessing the combination of good tear strength and resiliency needed in a cushion. A sample of the product was tested for solubility in cold dimethylformamide, and found to be entirely soluble therein, indicating that the structure was not polyurethane but three dimensional cross-linked polymers such as might be called polyallophanates of only moderate molecular weight. The cold solubility of the foam might be interpreted as evidence that the linear polyurethane chain formation was quite inadequate. Heating of the product for 1½ hours at 70° C. converted it into a substantially useless powder, thus establishing that a strong base by itself is not suitable as a catalyst for foam preparation from polyether-toluenediisocyanate compositions. The method using only sodium hydroxide as the catalyst exemplifies an inoperative procedure and should be contrasted with the methods embodying the invention.

By these and related preparations, it is established that sodium hydroxide and potassium hydroxide can be effective strong bases in the cocatalyst compositions and methods of the present invention, and that the concentration of the strong base must be not only from 0.1 to 1.2 molar but also within the range from 20% to 60% of the molar concentration of the triethylene diamine, which must be within the range from 0.5 to 2 molar.

Example III

Quaternary nitrogen compounds such as tetraethylammoniumhydroxide, when dissolved in water, have many of the characteristics of alkali metal hydroxides. Tetraethylammoniumhydroxide is a strong base having an ionization constant greater than 0.01. A catalyst solution was prepared by dissolving 0.3 gram of triethylene diamine and 0.15 gram tetraethylammoniumhydroxide in 2.3 milliliters of water (1.07 M $C_6H_{12}N_2$ and 0.4 M $C_8H_{21}ON$). This catalyst composition was employed in preparing a polyurethane foam article using the ingredients and proportions described in connection with Example I. The initially prepared article was stabilized by heating at 90° C. for 90 minutes. The cured foam was compressed 50%, heated for 22 hours at 70° C., and it recovered sufficiently that its compression set was measured as 11%. There is reason to believe that at least a portion of the tetraethylammoniumhydroxide was decomposed by the treatment for 90 minutes at 90° C. so that the completed article did not contain troublesome amounts of a strong base. The 11% compression set was so advantageously low as to be evidence that the tetraethylammoniumhydroxide had been completely decomposed prior to the measurement of the compression set.

Example IV

A polyhydroxy composition consisting of 60 grams of Pluronic L-61, 50 grams of Tetronic 701 and 5 grams of Quadrol and 0.7 milliliter of polydimethylsiloxane was converted to a creamy consistency by vigorous agitation with an aqueous catalyst solution containing 2.5 milliliters of water, 0.3 gram of triethylene diamine and 0.15 gram of tetraethylammoniumhydroxide. Instead of employing Nacconate 80 as the diisocyanate, 33 milliliters of Nacconate 65 (65% of the 2,4 and 35% of the 2,6 isomeric tolylenediisocyanate) were employed. A very satisfactory initial product was obtained which underwent less shrinkage during the stabilization treatment than somewhat similar articles prepared by the use of Nacconate 80. The heat stabilized article had a satisfactory compression set. The article had compression characteristics expressed by the measurement of 0.33 pound per square inch of 50% deflection. The success in using more than one variety of diisocyanate helped to establish that the catalyst system was advantageous in the preparation of polyurethane foams from polyethers without regard to the choice of isocyanate agent employed.

Example V

A very satisfactory polyurethane foam article was prepared using 100 grams of Niax LHT-112 (a polypropylene glycol ether marketed by the Union Carbide Chemical Company) instead of the Pluronic-Tetronic mixture, but otherwise following the proportions and procedures of Example IV. By a series of such preparations it is established that in preparing polyurethane foams from any polyether glycol, the cocatalysts and methods of the present invention are advantageous without regard to the choice of polyetherglycol employed.

Example VI

Good quality polyurethane foam articles were prepared using 6 grams of Hyprin instead of 5 grams of Quadrol, but otherwise following the procedure of Example V. By a series of such preparations, it is established that the cocatalysts and methods of the present invention are advantageous throughout a wide range of the cross-linking agents employed by those skilled in preparing polyurethane foam.

Example VII

Articles of commercially acceptable quality were prepared by the use of an aqueous catalyst solution consisting of 2.5 milliliters of water, 0.3 gram of triethylene diamine and 0.2 gram of triethylbenzylammonium hydroxide. Except for the use of the benzyl quaternary base instead of the tetraethyl compound, the proportions and methods were the same as in Example III. The usefulness of a variety of quaternary ammonium compounds as strong bases in the cocatalyst solutions is established by numerous preparations of this nature, involving merely the choice of strong base as the only variable. Those quaternary hydroxides, such as tetraethyl ammonium hydroxide, which completely decompose to form products substantially free from quaternary base at polyurethane curing conditions, such as 100–120° C. within a period less than three hours, have been found to be most advantageous.

Example VIII

Following in general the proportions and procedures of Example I, but substituting a mixture of 30 grams of Tetronic 701 and 70 grams of an adipate polyester for the 100 grams of polyetherglycol of Example I, there was prepared a tough polyurethane foam article having desirable flexibility and softness.

In another of the several preparations establishing that any of the polyesters employed by those skilled in producing polyurethane materials can be employed as components of the polyhydroxy composition, an excellent polyurethane foam article was prepared using Selectron 6207, a dimer acid polyester marketed by Emery Industries of Cincinnati, Ohio. The proportions and procedures of Example I were employed except for the use of 100 grams of Selectron 6207 to provide the 100 grams of polyhydroxy composition. Resilient foams prepared by the us of the catalyst composition of the present invention have an outstanding combination of low density and low compression set.

The catalyst composition of the present invention promotes reactions such as that of isocyanate groups with organic hydroxy groups, and promotes such reactions so effectively that the residual unreacted groups constitute only a very small concentration of the finished foam. This is believed to explain at least partially the reason why the resilient foams of the present invention possess such advantageous compression set characteristics.

Although the advantage of the catalyst composition is most conspicous when resilient foams are prepared by the one-shot method of using polyethers, the catalyst composition has superiority even when employed with polyether diisocyanate prepolymers.

Example IX

In a series of preparations, it is established that the properties of the product are dependent in part on the cross linking agents which may be included in the polyurethane composition. The proportion of polyhydroxy composition to water can be varied within the range customarily employed in polyurethane foam production, but not outside the ratio of from 20 to 80 parts of polyhydroxy composition to 1 part of water. It is sometimes helpful to describe a range from 50% to 200% as $2^{\pm 1}$ because the alternative sign in the exponential focuses attention upon the limits of the range. The water concentration can be designated as from 1.23 to 4.75 parts of water per 100 parts of polyhydroxy composition, or approximately $2.5 \times 2^{\pm 1}$ parts of water per 100 parts of polyhydroxy composition. By a series of preparations it is established that the molar concentration of the triethylene diamine must be from 0.5 molar to 2.0 molar, and that the molar concentration of the strong base must be not only less than the triethylene diamine concentration but also within the range from 20% to 60% of the triethylene diamine concentration. The ratio of isocyanato group to reactive organohydroxy group, the ratio of isocyanato group to water molecule, and similar ratios can be maintained within the conventional limits, but not outside the requirement for from about 15 to about 60 parts of organodiisocyanate per 100 parts of polyhydroxy composition.

*Example X*

A rigid foam was prepared by including a larger proportion of cross-linking agent in the composition, but otherwise following the procedure of Example VI. Thus a mixture of 100 g. of Pluronic L–61, 30 g. of Visco, 0.3 g. of triethylene diamine, 0.15 g. tetraethylammonium hydroxide and 2.3 ml. of water were dispersed into a cream and rapidly mixed with Nacconate 80 brand of tolylenediisocyanate to form a reaction mixture. The product was a rigid, light colored foam suitable for use as an insulation material. The catalyst compositions of the present invention bring about a very rapid gelation of the polyurethane foam, and this rapid gelation is advantageous when the components are sprayed on a vertical wall.

Obviously many modifications and variations of the invention as hereinbefore set forth may be made without departing from the spirit and scope thereof, and therefore only such limitations should be imposed as are indicated in the appended claims.

The invention claimed is:

1. The method of preparing a polyurethane foam article which method includes the steps of: dissolving an aqueous solution in a polyether glycol having an equivalent weight of about 1000 per free hydroxyl group to provide a polyol mixture, said aqueous solution containing triethylene diamine in a concentration within the range from about 0.5 to 2 molar, and said aqueous solution containing tetraalkyl ammonium hydroxide having an ionization constant greater than 0.01 in a molar concentration within the range from about 20% to about 60% of the molar concentration of the triethylene diamine, and dispersing throughout said polyol mixture from about 15 parts to about 60 parts of an organic diisocyanate per 100 parts of said polyether glycol, to form a reaction mixture which undergoes a transformation to a polyurethane foam article in the presence of tetraalkyl ammonium hydroxide and triethylene diamine as co-catalysts for said reaction mixture.

2. A catalyst composition for preparing polyurethane foam, said catalyst composition consisting of water, triethylene diamine in a concentration within the range from about 0.5 to about 2 molar, and a molar concentration of tetraalkyl ammonium hydroxide from 20% to 60% of the molar concentration of the triethylene diamine, said tetraalkyl ammonium hydroxide having an ionization constant greater than 0.01.

3. A catalyst composition for preparing polyurethane products by a method in which triethylene diamine is present in catalytic concentrations in a reaction mixture characterized by the presence of tolylene diisocyanate and polyetherglycol having an equivalent weight of 1000 per free hydroxyl group, said catalyst composition being characterized by the presence of the combination of triethylene diamine and a molar concentration of tetraalkyl ammonium hydroxide from 20% to 60% of the molar concentration of the triethylene diamine, said tetraalkyl ammonium hydroxide having an ionization constant greater than 0.01.

References Cited in the file of this patent

UNITED STATES PATENTS 2,842,506   Roussel ---------------- July 8, 1958

OTHER REFERENCES

"Dabco"—publication of Houdry Process Corp. Chem. Div., Philadelphia, Pa., Prelim. Data Bul., December 3, 1957; 6 pages.

UNITED STATES PATENT OFFICE
CERTIFICATE OF CORRECTION

Patent No. 3,042,632                                                   July 3, 1962

William E. Erner

It is hereby certified that error appears in the above numbered patent requiring correction and that the said Letters Patent should read as corrected below.

Column 3, line 61, for "$N(C_2H_4)_3$" read -- $N(C_2H_4)_3N$ --; column 6, line 50, for "us" read -- use --; line 62, for "conspicous" read -- conspicuous --.

Signed and sealed this 15th day of January 1963.

(SEAL)
Attest:

ERNEST W. SWIDER                                        DAVID L. LADD
Attesting Officer                                          Commissioner of Patents